(12) United States Patent
Zheng et al.

(10) Patent No.: US 12,156,323 B2
(45) Date of Patent: Nov. 26, 2024

(54) HIGH-TEMPERATURE SUPERCONDUCTING PLASMA THRUSTER SYSTEM HAVING VARIABLE TEMPERATURE RANGES AND BEING APPLIED IN SPACE

(71) Applicant: HEFEI INSTITUTES OF PHYSICAL SCIENCE, CHINESE ACADEMY OF SCIENCES, Hefei (CN)

(72) Inventors: Jinxing Zheng, Hefei (CN); Haiyang Liu, Hefei (CN); Xiaoliang Zhu, Hefei (CN); Yudong Lu, Hefei (CN); Ming Li, Hefei (CN); Yifan Du, Hefei (CN); Lei Zhu, Hefei (CN); Zhuoyao Tang, Hefei (CN)

(73) Assignee: HEFEI INSTITUTES OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 18/595,325

(22) Filed: Mar. 4, 2024

(65) Prior Publication Data
US 2024/0237185 A1 Jul. 11, 2024

(30) Foreign Application Priority Data
Jan. 10, 2023 (CN) .......................... 202310034812.7

(51) Int. Cl.
*H05H 1/28* (2006.01)
*B64G 1/40* (2006.01)
(Continued)

(52) U.S. Cl.
CPC ............... *H05H 1/28* (2013.01); *B64G 1/413* (2023.08); *F03H 1/0031* (2013.01); *H05H 1/54* (2013.01); *H05H 2242/10* (2013.01)

(58) Field of Classification Search
CPC . H05H 1/28; H05H 1/54; B64G 1/413; F03H 1/0031
See application file for complete search history.

(56) References Cited

U.S. PATENT DOCUMENTS

| 6,403,915 B1 * | 6/2002 | Cook ....................... H05H 1/34 219/121.52 |
| 2023/0407851 A1 * | 12/2023 | Collier-Wright ..... F03H 1/0031 |

FOREIGN PATENT DOCUMENTS

| CN | 112412720 A | 2/2021 |
| CN | 112509779 A | 3/2021 |

(Continued)

*Primary Examiner* — Arun Goyal
*Assistant Examiner* — William L Breazeal

(57) ABSTRACT

A high-temperature superconducting plasma thruster system, having variable temperature ranges and being applied in space, is provided. The high-temperature superconducting plasma thruster system includes: a cathode-anode assembly, a high-temperature superconducting magnet system, a supporting and adjusting platform, a power-and-gas supply and cooling system, and an obtaining control system. The cathode-anode assembly is disposed at a center of a ring of the high-temperature superconducting magnet system; the cathode-anode assembly and the high-temperature superconducting magnet system are spatially engaged with each other by the supporting and adjusting platform to form a main body of the thruster system; the power-and-gas supply and cooling system and the obtaining control system are located outside of the main body of the thruster system and are connected to the cathode-anode assembly and the high-temperature superconducting magnet system.

7 Claims, 5 Drawing Sheets

(51) Int. Cl.
*F03H 1/00* (2006.01)
*H05H 1/54* (2006.01)

(56) References Cited

FOREIGN PATENT DOCUMENTS

| | | |
|---|---|---|
| CN | 113309680 A | 8/2021 |
| DE | 202013004822 U1 | 10/2013 |
| GB | 2600493 A | 5/2022 |
| JP | 2011058398 A | 3/2011 |

\* cited by examiner

HIGH-TEMPERATURE SUPERCONDUCTING PLASMA THRUSTER SYSTEM HAVING VARIABLE TEMPERATURE RANGES AND BEING APPLIED IN SPACE

CROSS REFERENCE TO RELATED APPLICATIONS

The present application claims priority of Chinese patent application Ser. No. 20/2310034812.7, filed on Jan. 10, 2023, and contents of which are incorporated herein by its entireties.

TECHNICAL FIELD

The present disclosure relates to the field of plasma thruster systems, and in particular to a high-temperature superconducting plasma thruster system, which has variable temperature ranges and is applied in space.

BACKGROUND

Space tasks, such as a large spacecraft transferring to another orbit, manned lunar landing, and deep space exploration, have higher demands on a specific impulse, a thrust and a service life of a propulsion system. Traditional chemical propulsion and Hall propulsion each has a high thrust but a small specific impulse and a low payload. Ion propulsion has a high specific pulse but a small thrust. Therefore, the traditional chemical propulsion, the Hall propulsion, and the ion propulsion are unable to meet the demands of space tasks in the future. For a magnetic plasma thruster, a high temperature electric arc ionizes matrices to produce plasma, and the plasma is accelerated by a magnetic field and an electric field to generate a reversed thrust, applied on the thruster. The acceleration mechanism involves an acceleration mode, which is formed by coupling field acceleration, vortex acceleration, Hall acceleration, and aerodynamic acceleration with each other. The above-mentioned acceleration mode is regarded as the strongest electric propulsion by NASA and have various advantages in large spacecraft orbit transfer, manned lunar landing, deep space exploration, and so on.

In the art, a temperature range from 20K-77K is the most economical temperature range for a high-temperature superconducting high-field magnet to operate. The high-temperature superconducting magnet can be cooled to the temperature range in two ways. In one way, refrigeration is achieved by cool air convection, such as using cold helium to achieve refrigeration. The helium is cooled by a G-M refrigerator and then flows over a surface of the high-temperature superconducting magnet to exchange heat from the surface. The convection-based refrigeration has a fast refrigeration speed, and the magnet that is treated by the convection-based refrigeration has a small temperature gradient. However, a Dewar structure may have a complex structure, and the device may have a high cost. In the other way, conduction refrigeration is performed. For a basic principle of the conduction refrigeration, a vacuum technology is applied to eliminate convection heat exchange between the magnet and an external environment, and a thermal-radiation shielding technology is applied to significantly reduce thermal radiation from the external environment. Furthermore, coldness from the G-M refrigerator is conducted, through a conduction structure, to the surface of the high-temperature superconducting magnet to cool the magnet. A main disadvantage thereof is that a cooling speed is low, and the magnet has a large temperature gradient.

A power loss of the high-temperature superconducting plasma thruster system for space is mainly at an anode. 80% of a heat loss of the thruster is at the anode. The anode has a harsh thermal environment. Therefore, it is especially important how to efficiently dissipate heat from the anode. However, in the space environment, due to zero gravity, a cooling medium has a seriously reduced cooling efficiency on the anode. A traditional heat transfer structure cannot meet cooling demands of the anode.

SUMMARY OF THE DISCLOSURE

In order to solve the technical problem in the art, the present disclosure provides a high-temperature superconducting plasma thruster system, which has variable temperature ranges and is applied in space. The high-temperature superconducting plasma thruster system includes a cathode-anode assembly, a high-temperature superconducting magnet system, a supporting and adjusting platform, a power supply, a gas supply system, a cooling system, and an obtaining and control system. This is to solve the problems in the art in which the cathode-anode assembly has a low cooling efficiency; and when the thruster is operating, a porous cathode nozzles has a high temperature to cause corrosive loss. According to the present disclosure, a cooling method of the high-temperature superconducting magnet system may be further improved, a size and a weight of the magnet may be reduced, and strength of the magnetic field and magnetic configuration are optimized.

In order to achieve the above objectives, the present disclosure provides following technical solutions.

A high-temperature superconducting plasma thruster system includes a cathode-anode assembly, a high-temperature superconducting magnet system, a supporting and adjusting platform, a power-and-gas supply and cooling system, and an obtaining control system. The cathode-anode assembly is located at a center of a ring of the high-temperature superconducting magnet system. The cathode-anode assembly and the high-temperature superconducting magnet system are spatially engaged with each other by the supporting and adjusting platform to form a main body of the thruster system. The power-and-gas supply and cooling system and the obtaining control system are located outside of the main body of the thruster system and are connected to the cathode-anode assembly and the high-temperature superconducting magnet system.

The cathode-anode assembly includes a cathode-anode cooling and heat-exchanging assembly, a cathode-anode pressure-resistant and insulating assembly, and a plasma high-voltage ionization assembly. The cathode-anode cooling and heat-exchanging assembly includes an anode body, a spiral pipe heat-exchanging unit, and a multi-channel inlet-outlet pipe. The cathode-anode pressure-resistant and insulating assembly includes a sleeve-type ceramic and a G10 positioning flange plate. The plasma high-voltage ionization assembly includes a cathode body, a cathode inlet tube, a fixation ring, an inner cavity, a nozzle fixation seat, and a cathode nozzle.

Specific structures of the the cathode-anode system is as follows. The cathode inlet pipe is perpendicular to the inner cavity. One end of the inner cavity body is sealed, and the other end is connected to the nozzle fixation seat.

Specifically, a wall of an inner cavity is weldingly fixed to the cathode inlet pipe, and is further threadly connected to the nozzle fixation seat. The nozzle fixation seat is fixed to the cathode inlet pipe through high temperature welding. The above structure cooperatively form an inlet channel structure of the thruster.

Specifically, when the thruster is operating, a high electric field is generated between the cathode nozzle and the anode of the thruster. A propellant ejected from a body portion of the cathode nozzle is ionized in a discharging chamber, generating a high-temperature plasma. The high-temperature plasma is acceleratively ejected along an axis due to a strong magnetic field generated by the space superconducting magnet, such that a reverse thrust is generated to thrust a space vehicle.

Further, a wall of an outer cavity is fixed to the fixation ring and the wall of the inner cavity by welding to ensure airtightness of the inlet pipe. In addition, a cooling medium channel is defined between the fixation ring and the wall of the inner cavity, and the cooling medium is circulated through an inlet port and an outlet port.

The cathode-anode cooling and heat-exchanging assembly is configured to cool components of the thruster.

Since the high-temperature plasma between the cathode and the anode continuously discharge to cause erosion and sputtering when the thruster is operating, a large amount of heat is generated, and the heat is rapidly conducted to the inner cavity at a lower temperature. The cooling medium flows in the cooling channel, and circulation of the cooling medium takes away most of the heat generated during the operating. A large amount of heat is exported by forced convection and heat exchanging. In this way, the service life of the space superconducting magnetic plasma thruster is prolonged, ensuring that the thruster to discharge stably at a tip of the cathode nozzle, ensuring the overall structure to operate stably, further improving the service life of the thruster.

A temperature of the thruster is ensured to be not excessively high during operating by the cooling channel defined in the cathode of the thruster, such that reliability of the overall system is ensured. Two inlet ports and two outlet ports connecting to the cooling medium channel are evenly distributed at an upper portion and at a lower portion of an end of the outer cavity away from the porous cathode nozzle.

The spiral pipe heat-exchanging unit a heat-exchanging outer shell, a heat-exchanging inner portion, a first inlet pipe, a first outlet pipe, and a spiral channel located between the heat-exchanging outer shell and the heat-exchanging inner portion. The heat-exchanging inner portion is fixed to an outer circumference of the anode body and surrounds the outer circumference for one loop. The spiral channel is disposed in the heat-exchanging inner portion and surrounds the anode body for one loop.

Further, the spiral pipe heat-exchanging unit sleeves the outside of the anode of the thruster. One end of the anode of the thruster is fixedly connected to an insulating tube. The anode of the thruster and the insulating tube both sleeve the outside of the outer cavity.

The spiral channel is formed by taking a machine to process the heat-exchanging inner portion. After the heat-exchanging outer shell and the heat-exchanging inner portion are assembled and welded with each other to form a sealed cooling channel. The first inlet pipe and the first outlet pipe are welded to the heat-exchanging outer shell to ensure airtightness of the structure, preventing the cooling medium from leaking. The cooling medium enters the spiral channel through the first inlet pipe and flows out of the spiral channel through the first outlet pipe. The spiral channel significantly increases a flow path of the cooling medium, has a better thermal conductivity, and improves a heat exchanging capacity of the anode. The first inlet pipe and the first outlet pipe are arranged at opposite to each other.

The anode of the thruster includes a multi-channel heat exchanging unit. The multi-channel heat exchanging unit includes an end-portion outer shell, an end-portion cooling slot, a second inlet pipe, a second outlet pipe, and an end-portion cooling channel. The end-portion outer shell is fixed to a rear end of the anode of the thruster. A front end of the anode is connected to the insulating tube. An outer side of the end-portion outer shell defines the end-portion cooling slot. The end-portion cooling channel is located around the anode. An end of the end-portion cooling channel is communicated to the end-portion cooling slot; and the other end of the end-portion cooling channel is fluidly connected to the second inlet pipe or the second outlet pipe.

The number of second inlet pipes is equal to the number of the second outlet pipes. The second inlet pipes and the second outlet pipes are symmetrically distributed at the outside of the anode of the thruster. The end-portion outer shell, the anode of the thruster, and the insulating tube all sleeve the outside of the outer cavity.

The end-portion outer shell is welded with an anode body to form the end-portion cooling channel. The second inlet pipe and the second outlet pipe are welded and sealed with the anode body to prevent the cooling medium from leaking. The second inlet pipe and the second outlet pipe in the multi-channel heat exchanging unit are arranged alternately, such that heat exchange at the end portion of the anode may be uniform.

Further, the cathode-anode pressure-resistant and insulating assembly is disposed between the anode body and a cathode body, and the sleeve-type ceramic is used for insulation. The G10 positioning flange plate is configured to adjust relative positions of the cathode-anode pressure-resistant and insulating assembly, the anode body, and the cathode body.

The high-temperature superconducting magnet system includes a high-temperature superconducting coil assembly, a low-temperature cooling system for high-temperature-superconducting, a low-temperature thermal-insulation system, a Stirling refrigerator, a highly-vacuum outer Dewar, and a high-temperature plume protection plate. The high-temperature superconducting coil assembly includes YBCO superconducting double-pancake coils, a VPI coil insulation, and a sawtooth-sleeve single-side coil mounting skeleton. The low-temperature cooling system for high-temperature superconducting includes: a one-piece coldness storage mounting block of the coil skeleton; a U-shaped and adjustable copper foil crimped coldness-conductor plate; a cold head mounting seat of the refrigerator; and a fixation seat of a safe transmission section of a current lead. The low-temperature thermal-insulation system includes a transverse pulling rod and a radial pulling rod.

Further, the YBCO superconducting double-pancake coils are cured by the VPI coil insulation to form fixation and insulation between the double-pancake coils.

Further, the sawtooth-sleeve single-side coil mounting skeleton is processed in an L-shaped and in a monolithic manner. Four sets of YBCO superconducting double-pancake coils are mounted from an inside to an outside of the sawtooth-sleeve single-side coil mounting skeleton, in a sleeved manner. A 1 mm thick copper plate is disposed between the YBCO superconducting double-pancake coils. In this way, an overall sawtooth shape is formed, and the sawtooth-shaped structure is single-sided compressed to achieve multi-faced effective contacts.

Further, the refrigerator is a plurality of Stirling refrigerators that are uniformly distributed around an outer periphery of the Dewar. One end of the Stirling refrigerator provides a critical temperature of superconductivity for the YBCO superconducting double-pancake coils; and the other end of the Stirling refrigerator consumes Joule heat and conductive heat generated by the current lead.

Further, the low-temperature thermal-insulation system includes the transverse pulling rod and the radial pulling rod. Three radial pulling rods are uniformly distributed around the outer periphery of the superconducting coil, and every two adjacent radial pulling rods have an angle of 120° therebetween. Six transverse pulling rods are uniformly distributed in the superconducting coil.

The power-and-gas supply and cooling system includes a plasma torch power supply, a high-temperature superconducting power supply, a refrigerator power supply, a gas supply system and a cooling system.

The plasma torch power supply includes a primary power supply, a torch power supply, an arc starting power supply, and a near control/remote control system. The torch power supply and the arc starting power supply are connected to the cathode-anode system. The remote control system provides interfaces for optical fiber communication. An advanced high-frequency switching power supply technology is applied to the remote control system, and the remote control system is arranged with the latest switching elements, which has a constant-current output and good adaptability, operates stably, has parameters that can be adjusted within a wide range, provides a consummate and reasonable protection measure, and has a small size, a small weight and a high efficiency.

Further, the primary power supply provides power through a three-phase and four-wire alternating current having 380V and 50/60 Hz and takes a copper-core cable to connect a ground terminal disposed on a rear panel of a cabinet to the earth zero line. The arc-starting power supply provides a high-voltage pulse and is connected to the cathode-anode system to generate a high-voltage ionized plasma. The torch power supply provides a stable output current and a stable output voltage within a certain range and is connected to the cathode-anode system to maintain the plasma current generated by ionization. The remote control system has optical fiber communication interfaces RX and TX, optical fibers are used to connect to the TX and RX interfaces of an optical fiber hub, and the remote control system is further connected to a master computer.

The high-temperature superconducting power supply includes a direct current (DC) power supply assembly, a protection assembly against loss of superconductivity, a heat dissipation assembly, and a communication assembly. The DC power supply assembly includes: setting a target current, setting a voltage for over-voltage protection, setting a maximum current, and setting a current increasing/decreasing rate, such that the DC power supply assembly provides a highly-precise and stable current for the high-temperature superconducting magnet.

Further, the DC power supply assembly has a reference slow-increasing function. After the DC power supply assembly starts operating, an output current increases to reach the set current value within a set period of time. The protection assembly against loss of superconductivity provides protection against an overcurrent and an overtemperature. The communication assembly uses RS485 for communication.

The gas supply system includes a gas cylinder, a gas pipe, a decompression valve, a needle valve, a check valve, and a mass and flow meter of the gas.

Further, the gas cylinder is connected to the decompression valve outside the gas cylinder and is further successively connected to the check valve, the needle valve, the mass and flow meter of gas, and the inlet pipe of the cathode and the anode.

The cooling system includes a cathode cooling loop, a Stirling refrigerator cooling loop, a plasma torch power supply cooling loop. The cooling loop includes a thermometer, a flow meter, a pressure gauge, and a cooling pipe.

Further, the thermometer and pressure gauge are arranged at an inlet port of the cooling loop, and the thermometer and flow meter are arranged at a returning inlet of each branched loop.

The control system includes an obtaining module, a communication module, a master computer control, an interlock warning and emergency control, and human-computer interaction. The obtaining module obtains: a temperature of a cooling loop, a flow rate of the cooling loop, a mass and a flowing rate of a gas, a temperature of the refrigerator, a temperature of the outer Dewar of the magnet, a voltage of a high-temperature superconducting power supply coil. The master computer control includes: controlling the mass and the flow rate of the gas, controlling the plasma torch power supply, controlling the high-temperature superconducting power supply, controlling the refrigerator. The interlock warning and emergency control includes: a warning for a temperature of the cooling loop of the anode, a warning for a temperature of the magnet, emergency stop of the high-temperature superconducting power supply, and emergency stop of the plasma torch power supply.

Further, the obtaining module is connected to the master computer via the communication module to achieve communication between systems. Obtaining of the temperature of the cooling loop, obtaining of the flow rate of the cooling loop, obtaining of the mass and the flowing rate of the gas, obtaining of the temperature of the refrigerator, obtaining of the temperature of the outer Dewar of the magnet, obtaining of the voltage of the high-temperature superconducting power supply coil communicate with each other via analog signals. Controlling the mass and the flow rate of the gas, controlling the high-temperature superconducting power supply, AND controlling the refrigerator communicate with each other via analog signals. The controlling the plasma torch power supply is communicated with other modules by converting optical signals into analog signals.

The present disclosure provides a high-temperature superconducting plasma thruster system that has variable temperature ranges and is applied in space. The high-temperature superconducting plasma thruster system is a miniaturized high-temperature superconducting magnet system that takes the Stirling refrigerator as a cooling source. Therefore, the technical problem that a G-M refrigerator has a large size and weight, leading to high manufacturing costs and inconvenience in use, may be solved. In addition, in the cathode-anode assembly, the inlet and outlet of the cooling-medium channel in the cathode are disposed on the same side, such that more cooling medium may be retained in the cooling-medium channel, a time length that the cooling-medium channel is retained in the channel may be prolonged, the large amount of heat generated by the porous cathode nozzle may be taken away by the cooling medium, and the utilization efficiency of the cooling medium may be improved. Various structures of the porous cathode nozzle are connected to each other by welding, which is more reliable and can effectively prevent the cooling medium from leaking. By arranging the spiral pipe heat-exchanging unit at the anode of the thruster, a cooling time of the cooling medium in the heat-exchanging inner portion is increased effectively, improving the cooling efficiency. By arranging the multi-channel heat exchanging unit, the flow rate of the cooling medium is significantly increased, increasing a heat exchanging speed, such that generated coldness is increased. In addition, at the end of the multi-channel heat exchanging unit, the inlet ports and the outlet ports of the cooling channels are alternately arranged, such that the end of the anode may be uniformly cooled.

DETAILED DESCRIPTION

In order to make objectives, technical solutions and advantages of the present disclosure clearer and more understandable, the present disclosure is described in further detail hereinafter by referring to the accompanying drawings and embodiments. It is to be understood that, the specific embodiments described herein are only for explaining the present disclosure and are not to limit the scope of the present disclosure. In addition, technical features involved in various embodiments of the present disclosure described below may be combined with each other as long as they do not conflict with each other.

Figure 1:
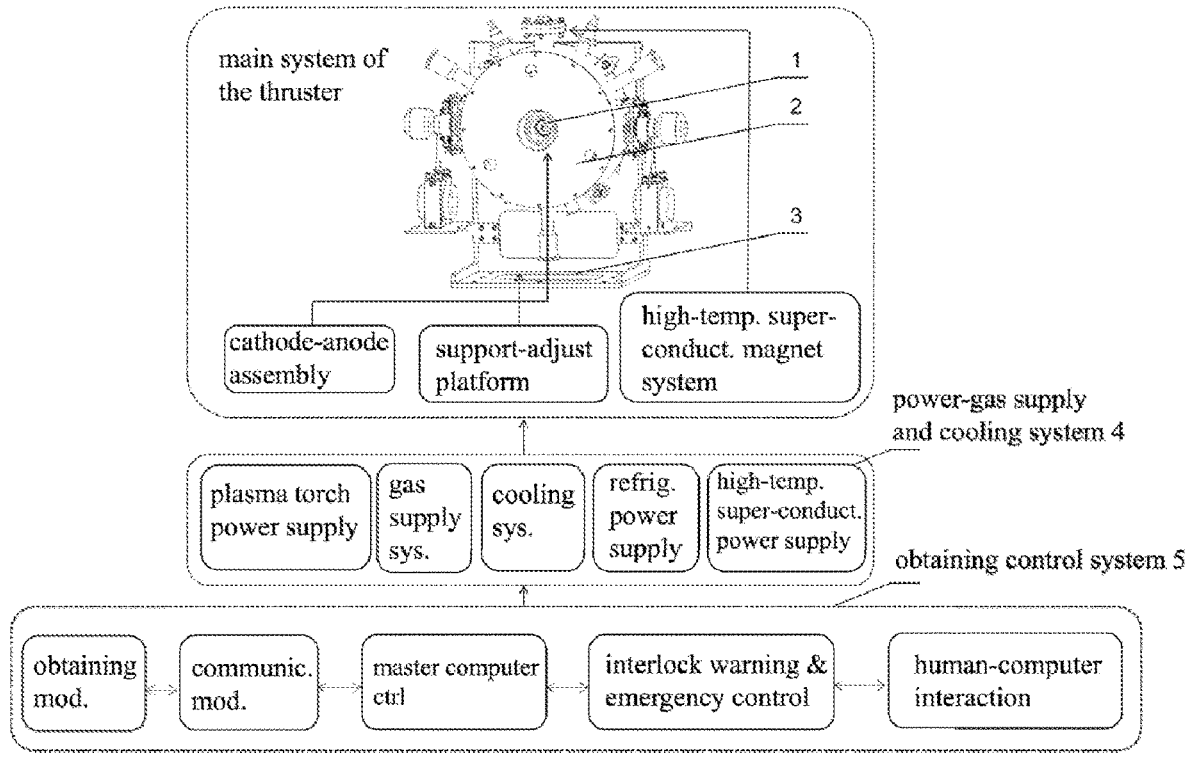
FIG. 1 is a structural schematic view of a high-temperature superconducting plasma thruster system, which has variable temperature ranges and is applied in space, according to an embodiment of the present disclosure.

As shown in FIG. 1, the present disclosure provides a high-temperature superconducting plasma thruster system, which has variable temperature ranges and is applied in space. The high-temperature superconducting plasma thruster system includes a cathode-anode assembly 1, a high-temperature superconducting magnet system 2, a supporting and adjusting platform 3, a power-and-gas supply and cooling system 4, and an obtaining control system 5.

As shown in FIG. 1, in the present embodiment, the power-and-gas supply and cooling system 4 is substantially a plasma torch power supply system providing 380 V three-phase four-wire alternating current (AC). The plasma torch power supply system provides a 0 A-200 A direct current (DC) for the high-temperature superconducting magnet system; provides a 24V/8 A DC for a Stirling refrigerator; provides low-frequency and high-frequency AC input signals for the obtaining control system; provides a working substance having a certain mass flow rate for the cathode-anode assembly; and provides a certain pressure, a certain temperature, and a working substance having a certain mass flow rate to the Stirling refrigerator, the plasma torch power supply, and the cathode-anode system for refrigeration.

As shown in FIG. 1, in the present embodiment, the obtaining control system 5 substantially obtains: a temperature of a cooling loop, a flow rate of the cooling loop, a mass and a flowing rate of a gas, a temperature of the refrigerator, a temperature of the outer Dewar of the manget, a voltage of a high-temperature superconducting power supply coil; and provides: a control of the mass and the flow rate of the gas, a control of the high-temperature superconducting power supply, a control of the plasma torch power supply, a control of the refrigerator, interlocking warning and emergency control of the various systems, and human-machine interaction. In this way, the superconducting coil is ensured to stably operate in a superconducting state, and the temperature of the anode does not exceed a certain limit value.

Figure 2:
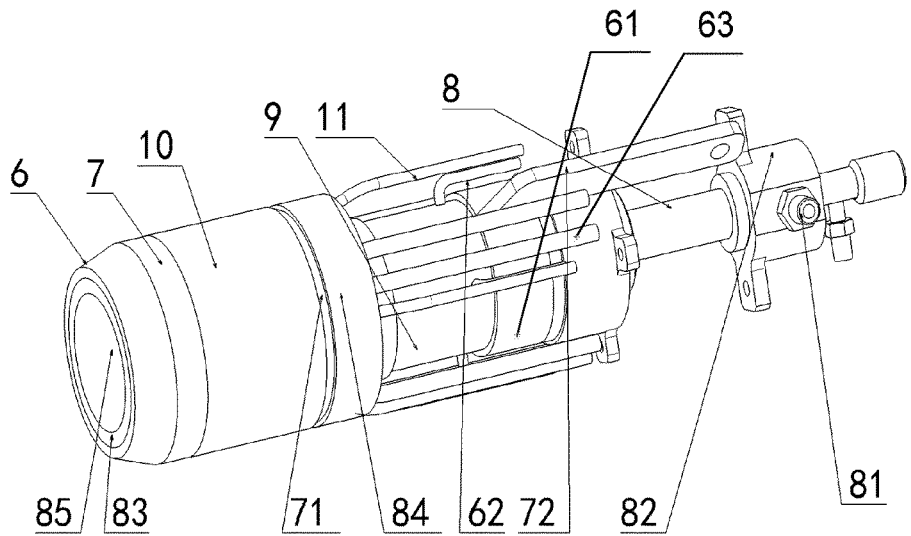
FIG. 2 is a cross-sectional view of a cathode-anode assembly and a front portion according to an embodiment of the present disclosure.

As shown in FIG. 2, the cathode-anode assembly 1 includes a cathode-anode cooling and heat-exchanging assembly 6, a cathode-anode pressure-resistant and insulating assembly 7, and a cathode 8. The cathode-anode cooling and heat-exchanging assembly 6 includes an anode body 61, a spiral pipe heat-exchanging unit 62, and a multi-channel inlet-outlet pipe 63. For the cathode-anode pressure-resistant and insulating assembly 7, an end of an embedded-sleeved ceramic 71 is fixed to the anode body 61, and the other end positions a flange plate 72 through the spiral pipe heat-exchanging unit 62 and G10. A wall of an inner cavity 83 of the cathode 8 is weldingly fixed to a cathode inlet pipe 81, the wall of an inner cavity 83 is connected to a nozzle fixation seat 84 in an M8 threaded manner. The nozzle fixation seat 84 is fixed to the cathode inlet pipe 81 through high temperature welding. The above structures cooperatively form a porous air intaking channel structure of the thruster. In addition, when the thruster is operating, arc discharging is generated between the cathode inlet pipe 81 and a cathode nozzle 85. A fixation ring member 82 and the wall of the inner cavity 83 are fixed to each other through welding, so as to ensure airtightness of the air intaking pipe, and a cooling-medium channel is defined between the fixation ring member 82 and the wall of the inner cavity 83.

Figure 3:
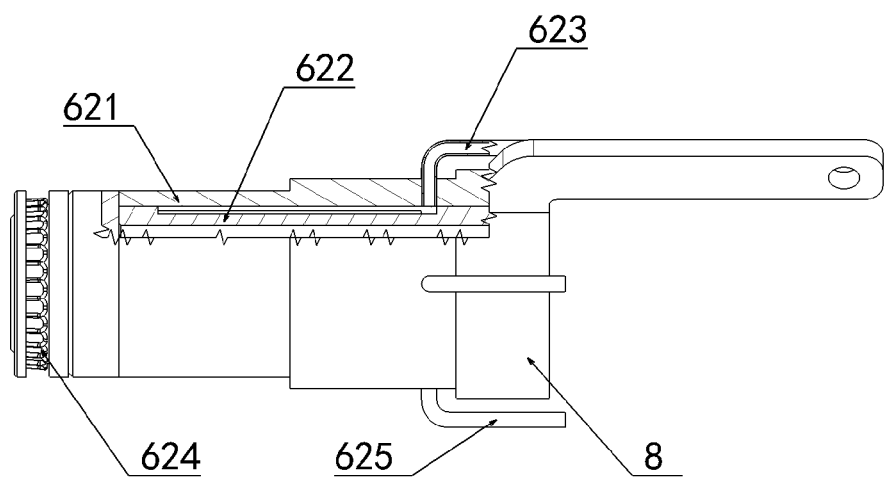
FIG. 3 is a structural schematic view of a spiral pipe unit according to an embodiment of the present disclosure.

As shown in FIG. 3, the spiral pipe heat-exchanging unit 62 includes a heat-exchanging outer shell 621, a heat-exchanging inner portion 622, a first inlet pipe 623, a first outlet pipe 624, and a spiral channel 625 located between the heat-exchanging outer shell and the heat-exchanging inner portion. The heat-exchanging inner portion 622 is fixed to an outer circumference of the anode body 61 and surrounds the outer circumference for one loop. The spiral channel 625 is disposed in the heat-exchanging inner portion and surrounds the anode body 61 for one loop.

Figure 4:
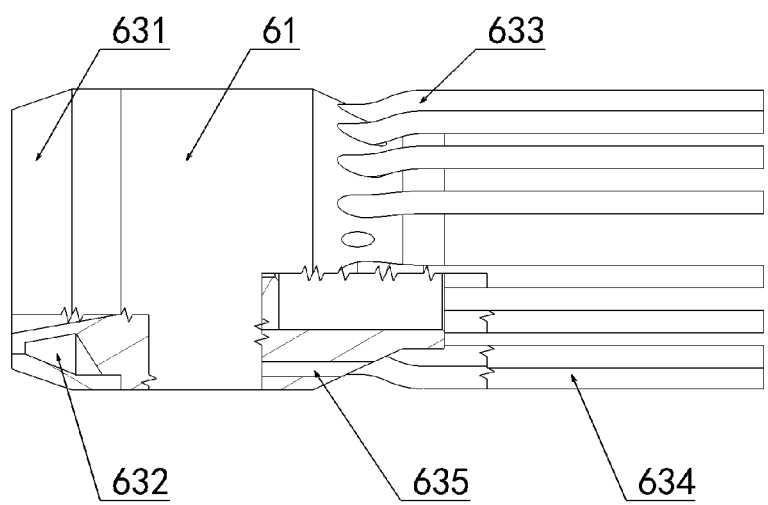
FIG. 4 is a structural schematic view of a heat exchanging unit having multiple channels, multiple inlet pipes and multiple outlet pipes, according to an embodiment of the present disclosure.

As shown in FIG. 4, the multi-channel inlet-outlet pipe 6 includes an end-portion outer shell 631, an end-portion cooling slot 632, a second inlet pipe 633, a second outlet pipe 634, and an end-portion cooling channel 635. The end-portion outer shell 631 is fixed to a rear end of the anode body 61 of the thruster. A front end of the anode body 61 is arranged with a plasma high-voltage discharging assembly 8. An outer side of the end-portion outer shell 631 defines the end-portion cooling slot 632. The end-portion cooling channel 635 is located around the anode body 61. An end of the end-portion cooling channel 635 is communicated to the end-portion cooling slot 632; and the other end of the end-portion cooling channel 635 is fluidly connected to the second inlet pipe 633 or the second outlet pipe 634.

Figure 5:
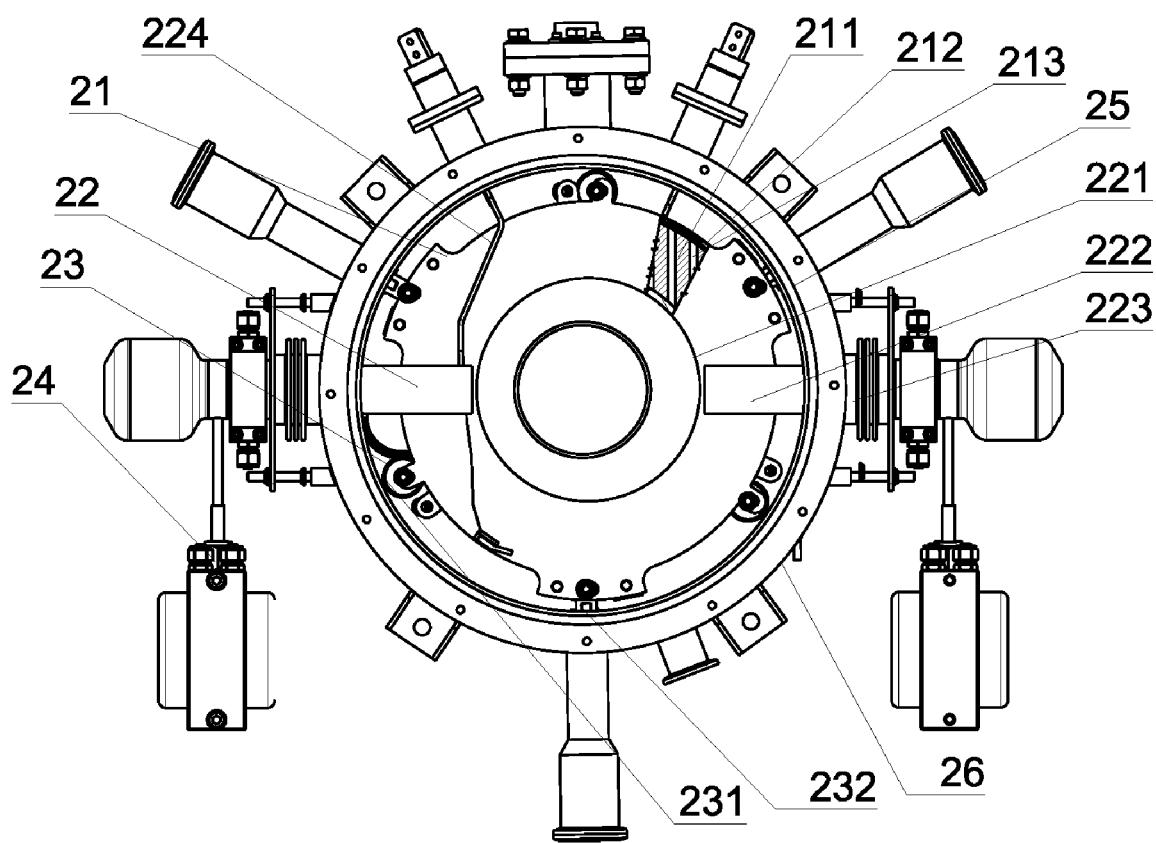
FIG. 5 is a structural schematic view of the high-temperature superconducting magnet system according to an embodiment of the present disclosure.

As shown in FIG. 5, in the present embodiment, the high-temperature superconducting magnet system 2 includes a high-temperature superconducting coil assembly 21, a low-temperature cooling system 22 for high-temperature superconducting, a low-temperature thermal-insulation system 23, a Stirling refrigerator 24, a highly-vacuum outer Dewar 25, and a high-temperature plume protection plate. The high-temperature superconducting coil assembly 21 includes a YBCO superconducting double-pancake coil 211, a VPI coil insulation 212, and a sawtooth-sleeve single-side coil mounting skeleton 213. The low-temperature cooling system 22 for high-temperature superconducting includes: a coldness conductive and storage block 221 that has symmetrical wing surfaces and is insulatable; a U-shaped and adjustable copper foil crimped coldness-conductor plate 222; a cold head mounting seat 223 of the refrigerator; and a safe transmission section 224 of a current lead. The low-temperature thermal-insulation system 23 includes a transverse pulling rod 231 and a radial pulling rod 232. Furthermore, the coldness conductive and storage block 221, which has symmetrical wing surfaces and is insulatable, is disposed at an outside of the sawtooth-sleeve single-side coil mounting skeleton 213 and is connected to the cold head of the Stirling refrigerator 24 through the U-shaped and adjustable copper foil crimped coldness-conductor plate 222. A lug, which is disposed at an end face of the sawtooth-sleeve single-side coil mounting skeleton 213, is mounted on a sealing flange of the highly-vacuum outer Dewar 25 through the low-temperature thermal-insulation system 23, including the transverse pulling rod 231 and the radial pulling rod 232, to form vacuum heat insulation and fixation. In this way, a gravitational force of the high-temperature superconducting coil assembly and an electromagnetic force, which is generated after the coil assembly is conducted, are counteracted. Furthermore, a critical temperature for a stable internal superconducting state may be formed based on the highly-vacuum.

Figure 6:
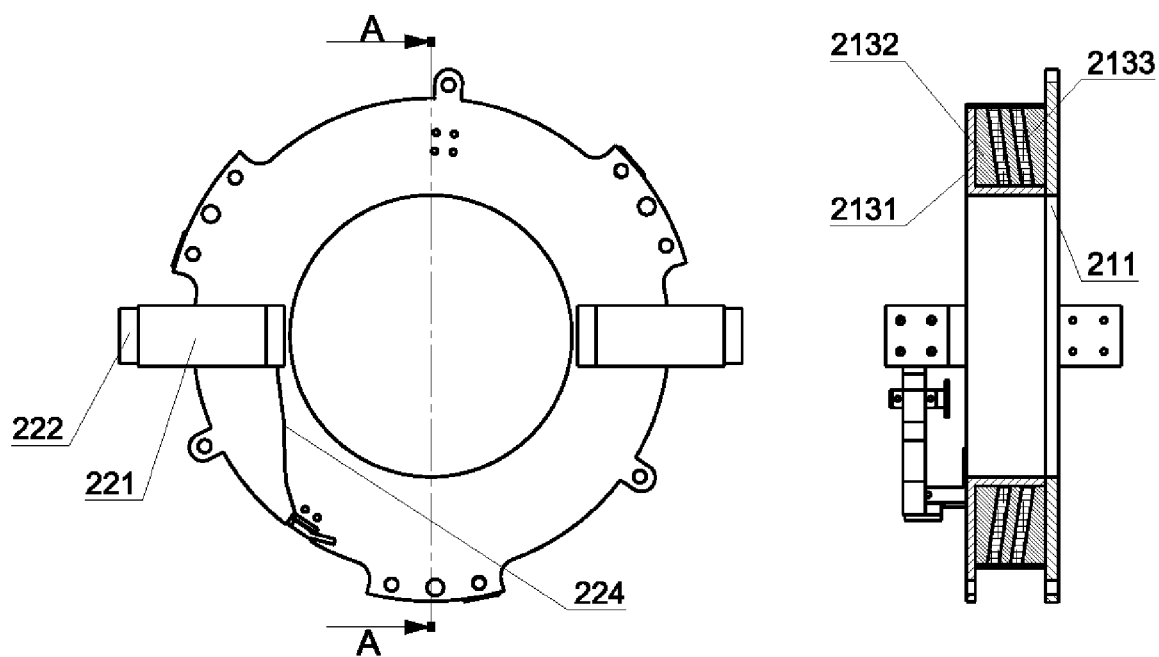
FIG. 6 is a structural schematic view of a high-temperature superconducting coil assembly and a low-temperature cooling system for high-temperature-superconducting according to an embodiment of the present disclosure.

As shown in FIG. 6, the YBCO superconducting double-pancake coils 211 in the high-temperature superconducting coil assembly 21 is mounted inside the sawtooth-sleeve single-side coil mounting skeleton 213 to form an integral structure. A main support structure of the sawtooth-sleeve single-side coil mounting skeleton 213 is obtained by processing an L-shaped cylinder 2131. Four sets of YBCO superconducting double-pancake coils are mounted from an inside to an outside of the sawtooth-sleeve single-side coil mounting skeleton 213, and an outer YBCO superconducting double-pancake coil sleeves an inner YBCO superconducting double-pancake coil. A 1 mm thick copper plate 2132 is disposed between the YBCO superconducting double-pancake coils. In this way, a sawtooth shaped is formed. At last, the above sawtooth-shaped structure is fixed by a single-sided compression fixing plate 2133, achieving multi-faced effective contacts. In the low-temperature cooling system 22 for high-temperature superconducting, an outer end surface of the coldness conductive and storage block 221 is connected to the cold head of the Stirling refrigerator 24 through the U-shaped and adjustable copper foil crimped coldness-conductor plate 222, such that coldness is transferred to provide superconducting coldness to the high-temperature superconducting coil assembly 21. An inner end surface of the coldness conductive and storage block 221 is connected, through an aluminum nitride ceramic, to the safe transmission section 224 of the current lead to absorb Joule heat and conducted heat generated by the current lead. In this way, coldness is stored effectively, ensuring the high-temperature superconducting magnet system 2 to be conducted safely and efficiently.

Figure 7:
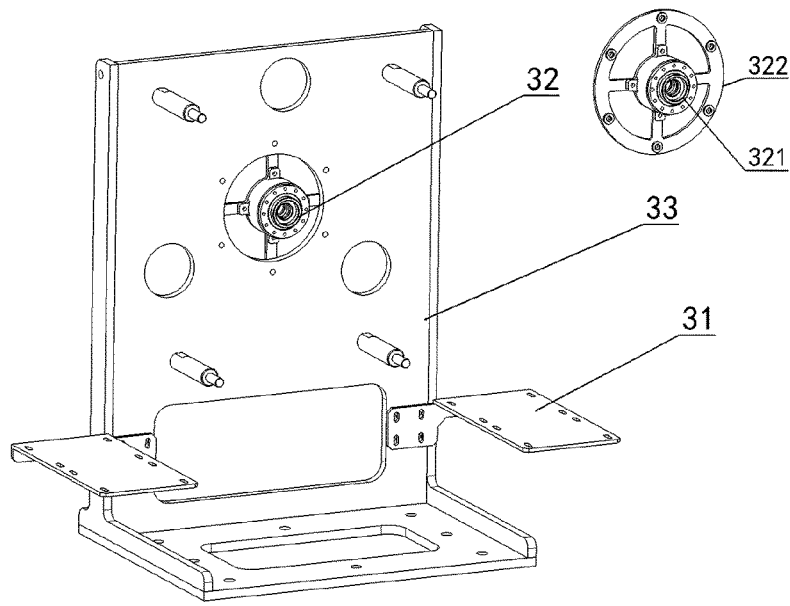
FIG. 7 is a structural schematic view of a supporting and adjusting platform according to an embodiment of the present disclosure.

As shown in FIG. 7, the supporting and adjusting platform 3 of the present embodiment includes an adjustment base plate 31 for a dispenser motor of the Stirling refrigerator; a fixation flange assembly 32 of the cathode-anode assembly; and an L-type base 33. The adjustment base plate 31 for a dispenser motor of the Stirling refrigerator is fixed to an end plate of the L-type base 33 by applying M5×16 bolts through rectangular-round holes. The adjustment base plate 31 may be slightly adjusted upwardly and downwardly. The fixation flange assembly 32 of the cathode-anode assembly is fixed to concentric circles on a rear of the end plate of the L-shaped base 33 by applying M6×20 bolts through a plurality of holes. The plurality of holes are evenly distributed in circularly, and a central angle between every two of the plurality of holes is 60. The fixation flange assembly 32 of the cathode-anode assembly includes a sleeve-type connecting seat 321 and a rotatable fixation flange 322. The sleeve-type connecting seat 321 is fixed to a radial reinforcing rib plate of the rotatable fixation flange 322 by the M5×25 bolts. The fixation flange assembly 32 of the cathode-anode assembly is arranged with the cathode-anode pressure-resistant and insulating assembly 7, and in this way, the cathode-anode cooling and heat-exchanging assembly 6 is separated from the cathode 8, and an impact caused by a high-pressure cooling medium when the device is switched on may be reduced.

Figure 8:
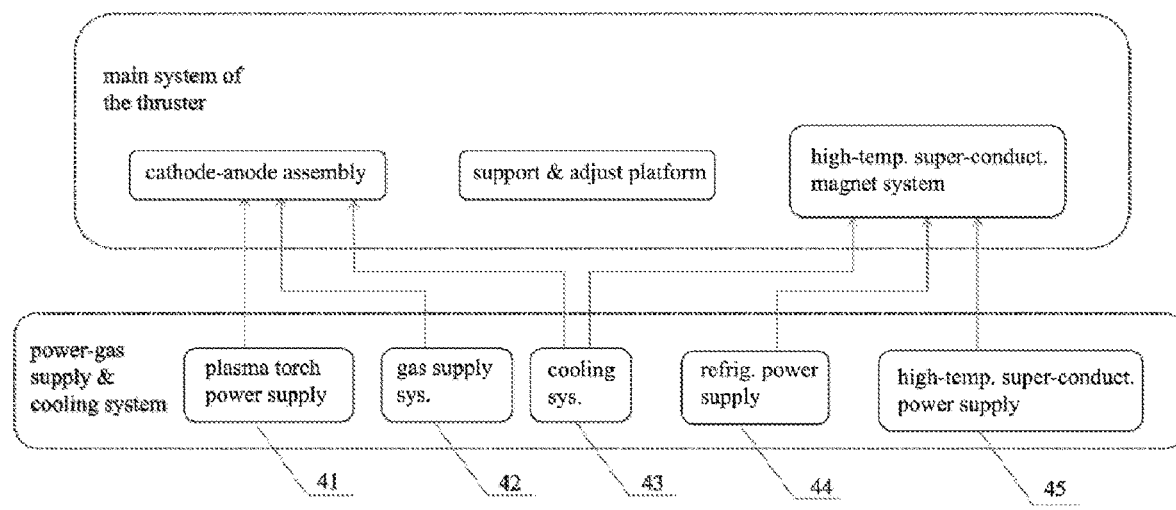
FIG. 8 is a structural schematic view of a power supply, a gas supply and cooling system according to an embodiment of the present disclosure.

As shown in FIG. 8, in the present embodiment, the plasma torch power supply system 41 in the power-and-gas supply and cooling system 4 is connected to the three-phase and four-wire alternating current having 380V and 50/60 Hz. A ground terminal on a rear panel of a cabinet of the plasma torch power supply system 41 is connected to the earth zero line through a copper-core cable. A positive electrode and a negative electrode of an output voltage are connected to the cathode-anode system. In an arc-starting stage, a 20 kV pulse voltage is provided, and a single high-voltage pulse has a duration of 20 μs, which is used to break through the working substance gas to form the plasma. In a stably-operating stage, a rated output voltage of 200 V is provided, a current of 500 A is stably output, and an output power is 100 kW, such that a stable plasma current is maintained. Relevant parameter settings include setting a spot arc time, setting an arc threshold, setting a steady state current, and setting a maximum current (Imax). Imax follower protection protects an abnormal operating point of the power supply timely and sensitively, such that load devices are protected in time to avoid damages. At the moment that the power supply is triggered, a torch power supply establishes a plasma channel through high-voltage breakdown. At this moment, the power supply detects the current. When the current is greater than the "arc threshold", the power supply stops being triggered, and a main power supply releases a triggering restriction, such that a good output property is achieved. When the power supply is less than "arc threshold", the power supply stops being triggered after the spot arc maintains for the set value of the spot arc time. Setting the arc threshold protects the cathode from ablation, such that an operating time is prolonged. The plasma torch power supply remotely controls communication interfaces RX and TX of system optical fibers, optical fiber cables are used to connect to the TX and RX interfaces of an optical fiber hub, and the plasma torch power supply is further connected to a master computer. An operating environment of the plasma torch power supply system needs to be maintained within a temperature range from 0° C.-40° C. and has a humidity of less than 90%. An area at which the plasma torch power supply system is located must not have corrosive vapors, corrosive particles, conductive particles, or particles that will become conductive after absorbing moistures. When a temperature of a heat dissipator arranged inside the power supply exceeds 65° C., the power supply will be protected from overheating, and in this case, an indicator is lit up, a buzzer alarms, and the power supply stops operating. After causes of the overheating is eliminated, and when the temperature of the power supply is reduced to reach a normal temperature range, the power supply is turned on again. The gas supply system 42 provides a certain mass and flow rate of the working substance gas to the cathode and the anode. A highly-precise gas flow meter controls and collects the gas flow. In the loop, a decompression valve is used to regulate a pressure of a gas cylinder releasing the gas, and a check valve is used to prevent the gas from flowing reversely. Gases of different masses and flow rates may be provided to the cathode and the anode during the system is operating. The gas pipe is made of stainless steel to prevent corrosion that may be caused in the space. The cooling system 43 includes a cathode-anode cooling loop, a Stirling refrigerator cooling loop, and a plasma torch power supply cooling loop. A thermometer, a flow meter, a pressure gauge are used to detect relevant parameters of any liquid working substance in the loop and provide the cooling medium having a certain pressure, a certain temperature, a certain mass and a certain flow rate and to cool the cooling medium. A refrigerator power supply 44 provides a direct current of 24V/8 A to the Stirling refrigerator to enable the refrigerator to operate normally. A high-temperature superconducting power supply 45 provides a highly-precise stable current for the high-temperature superconducting magnet based on a set target current, a set voltage for over-voltage protection, a set maximum current value, and a set increasing/decreasing rate of the current. The high-temperature superconducting power supply has a reference slow-increasing function. After the high-temperature superconducting power supply is switched on, an output current increases to reach the set current value at the set increasing rate within a set period of time. When a voltage of the coil exceeds a preset value, the high-temperature superconducting power supply is switched off emergently in order to protect the superconducting magnet. When the device stops operating, the output current decreases to 0 at the set decreasing rate within a set period of time. An operating environment of the high-temperature superconducting power supply needs to be maintained at a temperature rage of 25° C.±5° C. and at a humidity range of 10% to 65%.

Figure 9:
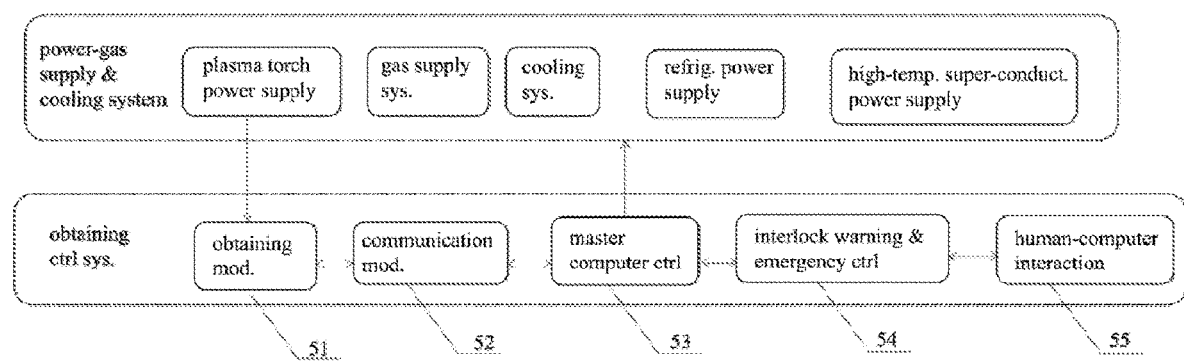
FIG. 9 is a structural schematic view of an obtaining and control system according to an embodiment of the present disclosure.

As shown in FIG. 9, in the present embodiment, an obtaining module 51 in the obtaining control system 5 includes collecting a temperature of a cooling loop, collecting the flow rate in the cooling loop, collecting the mass and the flow rate of the gas, collecting a temperature of the refrigerator, collecting a temperature of the Dewar out of the magnet, collecting a voltage of the high-temperature superconducting power supply coil. Hardware components of the obtaining module 51 include a liquid temperature sensor, a liquid flow meter, a gas flow meter, a temperature monitor, and so on. The communication module 52 takes analog signals and optical signals for communication and is arranged with: an RS485 communication assembly; an optic fiber communication box to achieve conversion from optical fiber communication to 485 communication; and an Ethernet-to-RS485 assembly. A master computer control 53 includes: control of the mass and the flow rate of the gas; control of the plasma torch power supply; control of the high-temperature superconducting power supply; control of the refrigerator. The control of the plasma torch power supply includes: arc stabilization; arc starting; closing/opening the main circuit; starting/stopping control. When the high-temperature superconducting plasma thruster system is operating, following controls are performed in sequence: closing the main circuit; starting the plasma torch power supply; starting the arc; stabilizing the arc. In this way, the gas working substance broken through to form the plasma, such that the plasma current is maintained. When the high-temperature superconducting plasma thruster system is stopped, following controls are performed in sequence: stopping the plasma torch power supply; and opening the main circuit. In this way, the plasma torch power supply stops operating. An interlock warning and emergency control 54 includes: a temperature warning of an anode cooling loop, a magnet temperature warning, an emergency stop of the high-temperature superconducting power supply, and an emergency stop of the plasma torch power supply. Since a large portion of a power of the high-temperature superconducting plasma thruster is deposited on the anode of the thruster, cooling at the anode is more severe. A temperature of the outlet of the anode cooling medium is an important monitoring parameter. When the temperature of the outlet of the anode cooling medium exceeds a certain limit, the system generates a warning. Stable operation of the high-temperature superconducting magnet requires the system to maintain at a certain temperature. Therefore, the temperature of the Dewar out of the high-temperature superconducting magnet needs to be monitored in real time. When the temperature of the Dewar out of the high-temperature superconducting magnet exceeds the certain limit, the system gives a warning and stops operating emergently, preventing the superconducting magnet from losing superconductivity. When the voltage of the coil exceeds a threshold value, the high-temperature superconducting power supply is switched off emergently to prevent the superconducting magnet from losing superconductivity. When the plasma torch power supply encounters dangerous situations, such as overloading, overcurrent, the temperature of the power supply being excessively high, the flow rate of the cooling medium being abnormal, and other situations that may damage the power supply, the plasma torch power supply is switched off emergently, stops outputting the power, and is soft-restarted to resume operating after the above situations are eliminated. A human-computer interaction 55 provides a human-computer interaction interface for the high-temperature superconducting plasma thruster system, to facilitate manual monitoring of data collected by each system and facilitate manual control.

The refrigeration method of the present invention is a Stirling-type unipolar continuous cooling, operating at 77 K of 10 W. Heat dissipation and cooling of the Stirling refrigerator is arranged with a separated cooling loop, to ensure a stable and reliable refrigeration efficiency. The Stirling refrigerator may be adapted to the vacuum radiation impact at high temperatures and low temperatures, within a wide temperature range of 116.15 K-394.15 K in the space. The YBCO superconducting double-pancake coils are thermally insulated from the external space through the highly-vacuum outer Dewar, ensuring that the high-temperature superconducting magnet is continuously conducted and ensuring stability of the superconducting state of the magnet. The high-temperature plume protection plate is tightly attached to the outside of the high-temperature plume injection port of the highly-vacuum outer Dewar, ensuring that an effective thermal insulation is formed between the highly-vacuum outer Dewar and the high-temperature plume. The plasma torch power supply is connected to the cathode and the anode through the cable to break through the plasma to form the plasma current. The high-temperature superconducting power supply is connected to the high-temperature superconducting magnet through the cable to provide the direct current and the protection against loss of superconductivity for the high-temperature superconducting magnet. In the cooling system, the cooling medium is convective to transfer heat to ensure the cathode and the anode, the Stirling refrigerator, and the plasma torch power supply to operate stably. The obtaining control system takes the master computer to collect and control the parameters of each system; to provide warning for key limits; to emergently switch off devices, such that the plasma thruster system is ensured to continuously and stably operate.

Any ordinary skilled person in the art shall understand that, the above description shows only preferred embodiments of the present disclosure and is not to limit the present disclosure. Any modifications, equivalent replacements, and improvements that are made within the spirit and principles of the present disclosure shall be included within the scope of the present disclosure.

What is claimed is:

1. A high-temperature superconducting plasma thruster system, having variable temperature ranges and being applied in space, wherein the high-temperature superconducting plasma thruster system comprises:
   a cathode-anode assembly, a high-temperature superconducting magnet system, a supporting and adjusting platform, a power-and-gas supply and cooling system, and an obtaining control system;
   wherein the cathode-anode assembly is disposed at a center of a ring of the high-temperature superconducting magnet system; the cathode-anode assembly and the high-temperature superconducting magnet system are spatially engaged with each other by the supporting and adjusting platform to form a main body of the high-temperature superconducting plasma thruster system; the power-and-gas supply and cooling system and the obtaining control system are located outside of the main body of the high-temperature superconducting plasma thruster system and are connected to the cathode-anode assembly and the high-temperature superconducting magnet system; the cathode-anode assembly comprises;
   a cathode-anode cooling and heat-exchanging assembly, a cathode-anode pressure-resistant and insulating assembly, and a cathode-anode plasma high-voltage ionization assembly;
   the cathode-anode cooling and heat-exchanging assembly comprises:
   an anode body, a spiral pipe heat-exchanging unit, and a multi-channel inlet-outlet pipe;
   the cathode-anode pressure-resistant and insulating assembly comprises:
   a sleeve-type ceramic and a G10 positioning flange plate;
   the cathode-anode plasma high-voltage ionization assembly comprises:
   a cathode inlet tube, a fixation ring, an inner cavity, a nozzle fixation seat, and a cathode nozzle.

2. The high-temperature superconducting plasma thruster system according to claim 1, wherein the high-temperature superconducting magnet system comprises a high-temperature superconducting coil assembly, a low-temperature cooling system for high-temperature-superconducting, a low-temperature thermal-insulation system, a Stirling refrigerator, a high vacuum outer Dewar, and a high-temperature plume protection plate;
   the high-temperature superconducting coil assembly comprises:
   YBCO superconducting double-pancake coils, a VPI coil insulation, and a sawtooth-sleeve single-side coil mounting skeleton;
   the low-temperature cooling system for high-temperature superconducting comprises:
   a coldness conductive and storage block that has symmetrical wing surfaces, a U-shaped and adjustable copper foil crimped coldness-conductor plate, a cold head mounting seat of the Stirling refrigerator, and a safe transmission section of a current lead; and
   the low-temperature thermal-insulation system comprises a transverse pulling rod and a radial pulling rod.

3. The high-temperature superconducting plasma thruster system according to claim 2, wherein the supporting and adjusting platform comprises:
   an adjustment base plate for a dispenser motor of the Stirling refrigerator;
   a fixation flange assembly of the cathode-anode assembly; and
   an L-type base;
   wherein the fixation flange assembly of the cathode-anode assembly comprises a sleeve-type connecting seat and a rotatable fixation flange.

4. The high-temperature superconducting plasma thruster system according to claim 2, wherein the obtaining control system includes an obtaining module, a communication module, a master computer control, an interlock warning and emergency control;
   the obtaining module is configured to obtain:
   a temperature of a cooling loop, a flow rate of the cooling loop, a mass and a flowing rate of a gas, a temperature of the Stirling refrigerator, a temperature of the high-vacuum outer outer Dewar, and a voltage of a high-temperature superconducting power supply coil;
   the master computer control is configured to control:
   the mass and the flow rate of the gas, the plasma torch power supply, the high-temperature superconducting power supply, and the Stirling refrigerator;
   the interlock warning and emergency control is configured to provide:
   a warning for a temperature of the cooling loop of the anode, a warning for a temperature of the magnet, emergency stop of the high-temperature superconducting power supply, and emergency stop of the plasma torch power supply.

5. The high-temperature superconducting plasma thruster system according to claim 4, wherein the master computer is configured: to collect and control parameters of the cathode-anode assembly, the high-temperature superconducting magnet system, the supporting and adjusting platform, and the power-and-gas supply and cooling system; to provide warning for key limit values; and to emergently switch off devices.

6. The high-temperature superconducting plasma thruster system according to claim 1, wherein the power-and-gas supply and cooling system comprises;

a plasma torch power supply, a gas supply system, another cooling system, a refrigerator power supply, and a high-temperature superconducting power supply.

7. The high-temperature superconducting plasma thruster system according to claim 6, wherein the Stirling refrigerator is configured to perform unipolar continuous cooling operating at 77 K and 10 W; wherein heat dissipation and cooling of the Stirling refrigerator is achieved by another separated cooling loop to ensure stable and reliable refrigeration efficiency;

wherein the Stirling refrigerator is adapted to vacuum radiation impact within a wide temperature range of 116.15 K-394.15 K in space;

wherein the YBCO superconducting double-pancake coils are thermally insulated from an external space through the high vacuum outer Dewar, ensuring that the high-temperature superconducting magnet ensuring stability of a superconducting state of the high-temperature superconducting magnet;

wherein a high-temperature plume protection plate is tightly attached to an outside of a high-temperature plume injection port of the high vacuum outer Dewar, ensuring that an effective thermal insulation is formed between the high vacuum outer Dewar and the high-temperature plume injection port;

wherein the plasma torch power supply is connected to the cathode-anode assembly through a cable to form a plasma current;

the high-temperature superconducting power supply is connected to the high-temperature superconducting magnet through another cable to provide a direct current and protection against loss of superconductivity for the high-temperature superconducting magnet; and wherein the power-and-gas supply and cooling system comprises another cooling system, and wherein the cooling system includes a cooling medium that is convective to transfer heat to ensure the cathode-anode assembly, the Stirling refrigerator, and the plasma torch power supply operate stably.

* * * * *